United States Patent
Cai et al.

(10) Patent No.: US 12,056,883 B2
(45) Date of Patent: Aug. 6, 2024

(54) METHOD FOR TESTING SKIN TEXTURE, METHOD FOR CLASSIFYING SKIN TEXTURE AND DEVICE FOR TESTING SKIN TEXTURE

(71) Applicant: ARCSOFT CORPORATION LIMITED, Zhejiang (CN)

(72) Inventors: Ximin Cai, Zhejiang (CN); Hehuan Xu, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 382 days.

(21) Appl. No.: 17/603,012

(22) PCT Filed: Apr. 9, 2020

(86) PCT No.: PCT/CN2020/083894
§ 371 (c)(1),
(2) Date: Oct. 12, 2021

(87) PCT Pub. No.: WO2020/207423
PCT Pub. Date: Oct. 15, 2020

(65) Prior Publication Data
US 2022/0237811 A1     Jul. 28, 2022

(30) Foreign Application Priority Data
Apr. 12, 2019     (CN) .......................... 201910292616.3

(51) Int. Cl.
G06K 9/00     (2022.01)
G06T 5/92     (2024.01)
(Continued)

(52) U.S. Cl.
CPC ................. *G06T 7/40* (2013.01); *G06T 5/92* (2024.01); *G06T 7/70* (2017.01); *G06V 10/34* (2022.01);
(Continued)

(58) Field of Classification Search
CPC . G06T 2207/30201; G06T 7/40; G06V 10/34; G06V 40/17
See application file for complete search history.

(56) References Cited

U.S. PATENT DOCUMENTS 7,170,645 B2 *  1/2007  Kim ..................... H04N 1/6005
                                                    358/1.9
8,013,906 B2 *  9/2011  Ikeda .................. H04N 1/6027
                                                    382/118
(Continued)

FOREIGN PATENT DOCUMENTS

CN     104299011 A     1/2015
CN     104732214 A     6/2015
(Continued)

OTHER PUBLICATIONS

International Search Report for corresponding application PCT/CN2020/083894 filed Apr. 9, 2020; Mail date Jul. 13, 2020.
(Continued)

*Primary Examiner* — Hadi Akhavannik
(74) *Attorney, Agent, or Firm* — Samson G. Yu

(57) ABSTRACT

The disclosure discloses a method for testing skin texture, a method for classifying skin texture and a device for testing skin texture. The method for testing skin texture includes: a face image is; a face complexion region and face feature points in the face image are acquired; and a face skin texture feature from the face image is acquired according to the face complexion region and the face feature points.

19 Claims, 2 Drawing Sheets

(51) Int. Cl.
*G06T 7/40* (2017.01)
*G06T 7/70* (2017.01)
*G06V 10/34* (2022.01)
*G06V 10/764* (2022.01)
*G06V 40/16* (2022.01)

(52) U.S. Cl.
CPC .......... *G06V 10/764* (2022.01); *G06V 40/171* (2022.01); *G06T 2207/30201* (2013.01)

(56) References Cited

U.S. PATENT DOCUMENTS

| | | | |
|---|---|---|---|
| 8,437,516 B2 | 5/2013 | Song et al. | |
| 9,007,480 B2* | 4/2015 | Ciuc | H04N 23/40 348/222.1 |
| 2003/0223622 A1* | 12/2003 | Simon | G06T 11/00 382/118 |
| 2006/0017773 A1* | 1/2006 | Sheraizin | H04N 1/628 347/43 |
| 2006/0034512 A1* | 2/2006 | Sheraizin | H04N 1/4092 382/173 |
| 2006/0182366 A1* | 8/2006 | Hsu | H04N 5/20 348/E5.073 |
| 2008/0100554 A1* | 5/2008 | Mori | G09G 3/3406 345/89 |
| 2010/0026831 A1* | 2/2010 | Ciuc | G06T 11/60 348/222.1 |
| 2010/0097485 A1* | 4/2010 | Lee | G06T 5/005 348/222.1 |
| 2013/0129234 A1* | 5/2013 | Farid | G06T 7/337 382/228 |
| 2014/0313303 A1* | 10/2014 | Davis | A61B 5/68 348/77 |
| 2015/0023552 A1* | 1/2015 | Rosen | G06Q 30/0276 382/103 |
| 2015/0099947 A1* | 4/2015 | Qu | A61B 5/442 600/306 |
| 2017/0206691 A1* | 7/2017 | Harrises | G02B 27/0172 |
| 2017/0221186 A1* | 8/2017 | Glotzbach | G06T 7/20 |
| 2019/0213453 A1* | 7/2019 | Ludwinski | G06V 40/168 |
| 2019/0251674 A1* | 8/2019 | Chang | G06V 10/993 |

FOREIGN PATENT DOCUMENTS

| | | |
|---|---|---|
| CN | 106469302 A | 3/2017 |
| CN | 107369133 A | 11/2017 |
| CN | 107392841 A | 11/2017 |
| CN | 107862659 A | 3/2018 |
| CN | 109086688 A | 12/2018 |
| CN | 109522839 A | 3/2019 |
| JP | 2004252511 A | 9/2004 |
| JP | 2010507854 A | 3/2010 |
| JP | 2011141622 A | 7/2011 |
| JP | 2013069122 A | 4/2013 |
| JP | 2013554851 A | 9/2013 |
| JP | 2015080647 A | 4/2015 |
| JP | 2016009203 A | 1/2016 |
| JP | 2016096931 A | 5/2016 |
| JP | 2017153555 A | 9/2017 |

OTHER PUBLICATIONS

First examination report for corresponding JP application 2021-559127 issued on Nov. 1, 2022.

Zhang, Jingyuan. "The design and implementation of portable face skin detection and evaluation system".

* cited by examiner

METHOD FOR TESTING SKIN TEXTURE, METHOD FOR CLASSIFYING SKIN TEXTURE AND DEVICE FOR TESTING SKIN TEXTURE

CROSS-REFERENCE TO RELATED APPLICATION

The disclosure claims the priority for Chinese Patent Application Priority No. "201910292616. 3.", filed to the Chinese Patent Office on Dec. 4, 2019 and entitled "Method for Testing Skin Texture, Method for Classifying Skin Texture and Device for Testing Skin Texture", which is incorporated herein in its entirety by reference.

TECHNICAL FIELD

The disclosure relates to computer vision processing technology, in particular to a method for testing skin texture, a method for classifying skin texture and a device for testing skin texture.

BACKGROUND

With development of society and improvement of living standards, people pay increasing attention to personal images, especially to skins. Generally speaking, for identifying some common defective skin texture, conventional manual observation is required, but for testing the skin texture more accurately, scientific means are required. At present, bioelectrical impedance analysis is mainly used to test skin texture, which evaluates skin texture by measuring electrical impedance features of the skins. However, the method can test a small number of skin texture features, such as moisture and fat secretion of the skins. In addition, a tester has to make contact with the skins directly, and therefore, a testing result is greatly influenced by contact impedance, and testing precision is poor. Moreover, the method requires additional professional hardware apparatuses, most of which can be operated by professionals and require users to complete testing in specific testing sites, and application groups and application scenes are limited to some extent consequently. These hardware apparatuses involve high cost, and therefore are inconvenient to apply and promote in practice.

SUMMARY

According to one aspect of one of the embodiments of the disclosure, the method for testing skin texture is provided. The method includes: a face image is acquired; a face complexion region and face feature points in the face image are acquired; and a face skin texture feature from the face image is acquired according to the face complexion region and the face feature points.

In at least one alternative embodiment, the step that a face complexion region and face feature points in the face image are acquired includes: the face complexion region is acquired by using a complexion testing algorithm.

In at least one alternative embodiment, the method further includes: five sense organ regions of the face image are removed according to the face feature points, to acquire the face complexion region.

In at least one alternative embodiment, the method further includes: the face complexion region is processed by using a morphological algorithm, to expand the five sense organ regions removed.

In at least one alternative embodiment, the face skin texture feature includes at least one of a complexion, a freckle, a pore, a wrinkle, under-eye dark circles and smoothness.

In at least one alternative embodiment, the step that a face skin texture feature from the face image is acquired according to the face complexion region and the face feature points includes: a detailed diagram of the face complexion region is acquired by using a high pass algorithm.

In at least one alternative embodiment, the method further includes: face direction information is acquired according to the face feature points.

In at least one alternative embodiment, when the face skin texture feature includes a freckle and/or a pore, the step that a face skin texture feature from the face image is acquired according to the face complexion region and the face feature points further includes: a testing result of the freckle and/or the pore in the detailed diagram is acquired by using a first preset algorithm; and the freckle and/or the pore is distinguished according to shape features.

In at least one alternative embodiment, when the face skin texture feature includes the smoothness, the method includes: the smoothness is acquired through a gray level co-occurrence matrix algorithm according to the testing result of the freckle and/or the pore.

In at least one alternative embodiment, when the face skin texture feature includes a wrinkle, the step that a face skin texture feature from the face image is acquired according to the face complexion region and the face feature points further includes: a testing result of the wrinkle in the detailed diagram is acquired by using a second preset algorithm; and a type of the wrinkle is determined according to face direction information and the face feature points.

In at least one alternative embodiment, when the face skin texture feature includes under-eye dark circles, a face skin texture feature from the face image according to the face complexion region and the face feature points includes: according to eye feature points in the face feature points, an upper Bezier curve and a lower Bezier curve in the face image are drew, the under-eye dark circles are located, and a testing result of the under-eye dark circles in the face image is acquired by determining a difference between a brightness mean of positions of the under-eye dark circles and a surrounding region.

In at least one alternative embodiment, the method for testing skin texture further includes: the face image is enhanced to acquire an enhanced face image.

In at least one alternative embodiment, the step that the face image is enhanced to acquire an enhanced face image includes: brightness of the face image are acquired; and contrast of a low gray level region in the face image is enhanced to acquire the enhanced face image.

In at least one alternative embodiment, the step that brightness of the face image are acquired includes: the face image is converted into an image in a YUV format through a color conversion algorithm, and a Y channel image in the image in the YUV format is extracted to acquire the brightness of the face image.

According to one aspect of one of the embodiments of the disclosure, the method for classifying skin texture is provided. The method includes: a face skin texture feature is acquired by using the method for testing skin texture above; and face skin texture is classified into different classes by using a machine learning method according to the face skin texture feature.

In at least one alternative embodiment, the method includes: corresponding retouching parameters are set according to the different classes of the face skin texture.

In at least one alternative embodiment, the method is applied to an electronic device with a video calling or photographing function.

According to another aspect of one of the embodiments of the disclosure, the device for testing skin texture is provided. The device includes: an image collection element configured to acquire a face image; an acquisition element configured to acquire a face complexion region and face feature points in the face image; and a skin texture testing element configured to test a face skin texture feature from the face image according to the face complexion region and the face feature points.

In at least one alternative embodiment, the acquisition element includes a complexion acquisition element configured to acquire the face complexion region in the face image through a complexion testing algorithm.

In at least one alternative embodiment, the complexion acquisition element is further configured to remove five sense organ regions of the face image according to the face feature points, to acquire the face complexion region.

In at least one alternative embodiment, the complexion acquisition element is further configured to process the face complexion region by using a morphological algorithm, to expand the five sense organ regions removed.

In at least one alternative embodiment, the face skin texture feature includes at least one of a complexion, a freckle, a pore, a wrinkle, under-eye dark circles and smoothness.

In at least one alternative embodiment, the skin texture testing element is further configured to acquire a detailed diagram of the face complexion region by using a high pass algorithm.

In at least one alternative embodiment, the skin texture testing element is further configured to acquire face direction information according to the face feature points.

In at least one alternative embodiment, the skin texture testing element includes a freckle and pore testing element, and the freckle and pore testing element is configured to acquire a testing result of a freckle and/or a pore in the detailed diagram by using a first preset algorithm, and distinguish the freckle and/or the pore according to shape features.

In at least one alternative embodiment, the skin texture testing element includes the smoothness testing element configured to acquire smoothness through a gray level co-occurrence matrix algorithm according to the testing result of the freckle and/or the pore.

In at least one alternative embodiment, the skin texture testing element includes a wrinkle testing element configured to acquire a testing result of a wrinkle in the detailed diagram by using a second preset algorithm, and determine a type of the wrinkle according to face direction information and the face feature points.

In at least one alternative embodiment, the skin texture testing element includes an under-eye dark circles testing element configured to draw, according to eye feature points in the face feature points, an upper Bezier curve and a lower Bezier curve in the face image, locate the under-eye dark circles, and acquire a testing result of the under-eye dark circles in the face image by determining a difference between a brightness mean of positions of the under-eye dark circles and a surrounding region.

In at least one alternative embodiment, the device further includes an image enhancement element configured to enhance the face image to acquire an enhanced face image.

In at least one alternative embodiment, the image enhancement element includes a brightness acquiring unit configured to acquire brightness of the face image; and a contrast enhancement unit configured to enhance contrast of a low gray level region in the face image to acquire the enhanced face image.

In at least one alternative embodiment, the brightness acquiring unit is further configured to convert the face image into an image in a YUV format through a color conversion algorithm, and extract a Y channel image in the image in the YUV format to acquire the brightness of the face image.

According to another aspect of one of the embodiments of the disclosure, an electronic device is provided. The electronic device includes: a processor, and a memory configured to store an executable command of the processor, wherein the processor is configured to execute the executable command to implement the method for testing skin texture according to any one described above.

According to another aspect of one of the embodiments of the disclosure, a storage medium is provided. The storage medium includes a stored program, wherein when being run, the program controls a device where the storage medium is located to implement the method for testing skin texture according to any one described above.

BRIEF DESCRIPTION OF THE DRAWINGS

The accompanying drawings described herein are used for providing further understanding of the disclosure and constitute part of the disclosure. Schematic embodiments of the disclosure and descriptions thereof are used to explain the disclosure, but not constitute an improper limit to the disclosure. In the accompanying drawings.

DETAILED DESCRIPTION OF THE EMBODIMENTS

In order to enable a person of ordinary skill in the art to better understand solutions of the disclosure, the following clearly and completely describe the technical solutions in the embodiments of the disclosure with reference to the accompanying drawings in the embodiments of the disclosure. Apparently, the described embodiments are some rather than all of the embodiments of the disclosure. All other embodiments obtained by a person of ordinary skill in the art based on the described embodiments of the disclosure shall fall within the protection scope of the disclosure.

It should be noted that the terms "first", "second", etc. in the specification and claims of the disclosure and the above accompanying drawings are used to distinguish similar objects, but are not necessarily used to describe a specific sequence or a precedence order. It should be understood that data used in this way can be interchanged under appropriate circumstances, such that the embodiment of the disclosure described herein may be implemented in a sequence other than those illustrated or described herein. In addition, terms "including", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to the processes, methods, products, or devices.

The embodiments of the disclosure may be applied to compute systems/servers that may operate with numerous other general purpose or special purpose computing system environments or configurations. Examples of well-known computing systems, environments, and/or configurations suitable for use with the computer systems/servers include, but are not limited to, personal computer systems, handheld or laptop devices, microprocessor-based systems, programmable consumer electronics products, small computer systems, large computer systems, distributed cloud computing technology environments including any of the above systems, etc.

The computer systems/servers may be described in the general context of computer system executable instructions (such as program elements) executed by the computer systems. Generally, program elements may include routines, programs, object programs, components, logic and data structures, etc., which perform specific tasks or implement specific abstract data types. The computer systems/servers may be implemented in the distributed cloud computing environments, and tasks are performed by remote processing devices linked through a communication network. In the distributed cloud computing environments, the program elements may be located on local or remote computing system storage media including storage devices.

The following describes the disclosure through detailed embodiments.

Figure 1:
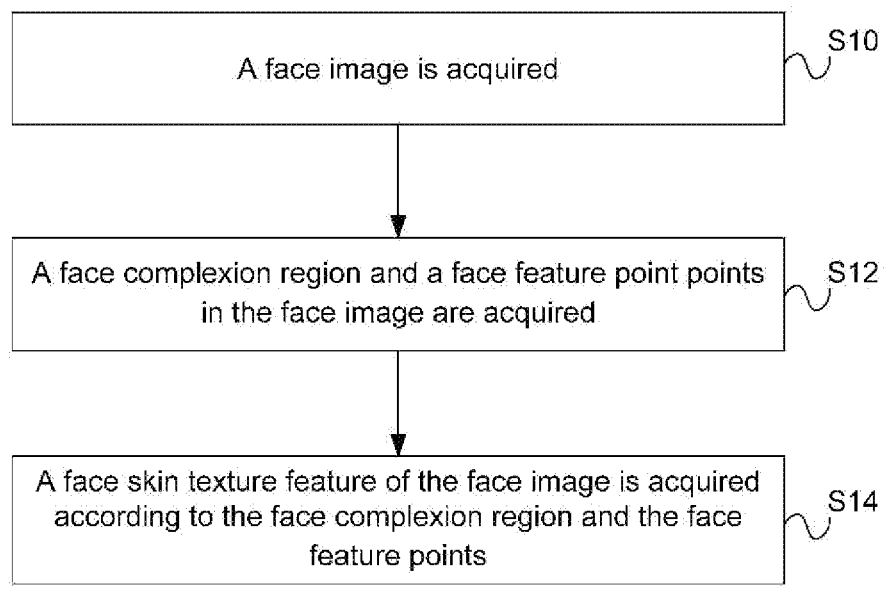
FIG. 1 is a flowchart of an optional method for testing skin texture according to one of embodiments of the disclosure.

According to one aspect of the disclosure, a method for testing skin texture is provided. FIG. 1 is a flowchart of an optional method for testing skin texture according to one of embodiments of the disclosure. As shown in FIG. 1, the method includes the following steps:

S10: a face image is acquired;

S12: a face complexion region and face feature points in the face image are acquired; and S14: a face skin texture feature from the face image is acquired according to the face complexion region and the face feature points.

In this embodiment of the disclosure, the method includes the following steps: the face image is acquired; the face complexion region and the face feature points in the face image are acquired; and the face skin texture feature from the face image is acquired according to the face complexion region and the face feature points. In this way, the face skin texture feature may be tested on the basis of the face image, and more skin texture features may be tested as needed without increasing a cost and a size of hardware, thus improving testing precision.

Each step above is described in detail below.

S10, the face image is acquired.

In at least one alternative embodiment, in one of the embodiments of the disclosure, the face image may be acquired through an image collection element, the image collection element may be an independent camera head or a camera head integrated on an electronic device, such as an independent RGB camera, or a built-in camera of an onboard electronic device (including but not limited to a touch screen, a navigator, etc.), a mobile phone, a tablet computer, a desktop computer, a skin texture testing instrument, etc.

S12: the face complexion region and the face feature points in the face image are acquired.

In at least one alternative embodiment, in one of the embodiments of the disclosure, the face complexion region in the face image may be acquired through a complexion testing algorithm. For example, the face image may be converted into a YCbCr color space through the complexion testing algorithm, then a CrCb value of each pixel point is put into an elliptic statistical model acquired according to skin pixels, if a coordinate of the CrCb is located in the elliptic statistical model, the pixel points is determined as a complexion, through which the face complexion region is acquired. The face feature points may be acquired by a supervised descent method (SDM) algorithm.

In at least one alternative embodiment, in one of the embodiments of the disclosure, in order to acquire a more accurate face complexion region, five sense organ regions in the face image may be removed according to the face feature points, to acquire the face complexion region. In addition, a morphological algorithm (for example, a corrosion expansion algorithm) may also be utilized to process the face complexion region, so as to expand the removed five sense organ regions, thus avoiding the problem that the five sense organ regions are not completely removed and remain due to image offset.

S14: the face skin texture feature from the face image is acquired according to the face complexion region and the face feature points.

In at least one alternative embodiment, in one of the embodiments of the disclosure, the face skin texture feature includes at least one of a complexion, a freckle, a pore, a wrinkle, under-eye dark circles and smoothness.

In at least one alternative embodiment, in one of the embodiments of the disclosure, when the face skin texture feature includes a freckle and/or a pore, the step that the face skin texture feature from the face image is acquired according to the face complexion region and the face feature points includes: a detailed diagram of the face complexion region is acquired by using a high pass algorithm, a testing result of the freckle and/or the pore in the detailed diagram is acquired by using a first preset algorithm (for example, a local adaptive threshold algorithm), the testing result including at least one of a position, the number and an area; and the freckle and/or the pore is distinguished according to shape features, wherein shape features of the pore are in a shape similar to a circle with a generally small area, and shape features of the freckle are in a shape with a relatively large area. Preferably, after the testing result of the freckle and/or the pore in the detailed diagram is acquired by using the local adaptive threshold algorithm, isolated points of the freckle and/or the pore may be removed by using the morphological algorithm (for example, the corrosion expansion algorithm) to eliminate influence of noise, and a connected domain algorithm is used to eliminate wrong points with an abnormal shape or an excessively large area in an initial testing result. Preferably, the above step may be implemented in the face complexion region with the five sense organ regions removed, so as to reduce a false testing rate of the freckle and/or the pore.

In at least one alternative embodiment, in one of the embodiments of the disclosure, after the testing result of the freckle and/or the pore is acquired, the smoothness may be acquired through a gray level co-occurrence matrix algorithm according to the testing result of the freckle and/or the pore. For example, parameters such as energy, entropy, contrast and inverse difference moment at degree, 45 degrees, 90 degrees and 135 degrees are calculated through the gray level co-occurrence matrix algorithm, and then the smoothness feature is acquired with the 16 parameters.

In at least one alternative embodiment, in one of the embodiments of the disclosure, when the face skin texture feature includes a wrinkle, a face skin texture feature from the face image is acquired according to the face complexion region and the face feature points further includes: a detailed diagram of the face complexion region is acquired by using a high pass algorithm, face direction information is acquired according to the face feature points, a testing result of the wrinkle in the detailed diagram is acquired by using a second preset algorithm, and a type of the wrinkle is determined according to the face direction information and the face feature points. The testing result includes at least one of a position, the number and an area. Preferably, after the second preset algorithm is used to acquire the testing result of the wrinkle in the detailed diagram, the morphological algorithm and the connected domain algorithm are used to eliminate some objects which obviously do not belong to the wrinkle.

In at least one alternative embodiment, in one of the embodiments of the disclosure, the steps that the testing result of the wrinkle in the detailed diagram of the wrinkle is acquired by using the second preset algorithm, and a type of the wrinkle is determined according to the face direction information and the face feature points may include: a position of a wrinkle is acquired by using the local adaptive threshold algorithm, a wrinkle which is generally in a horizontal direction is determined as a periocular wrinkle according to the face feature points and the face direction information, a position of a wrinkle is acquired by using a Canny edge extraction algorithm, and according to the face feature points and the face direction information, a wrinkle which is generally in a horizontal direction is determined as a forehead wrinkle and a wrinkle which is generally in a diagonal direction is determined as a nasolabial wrinkle.

In at least one alternative embodiment, in one of the embodiments of the disclosure, when the face skin texture feature includes under-eye dark circles, the step that a face skin texture feature from the face image is acquired according to the face complexion region and the face feature points further includes: according to eye feature points in the face feature points, an upper Bezier curve and a lower Bezier curve are drew in the face image, testing regions of the under-eye dark circles are located, a difference between a brightness mean of the testing regions of the under-eye dark circles and a surrounding region is calculated and severity of the under-eye dark circles is determined.

In at least one alternative embodiment, in one of the embodiments of the disclosure, after the step S10 acquiring the face image, the method further includes step S11: the face image is enhanced to acquire an enhanced face image.

In at least one alternative embodiment, in one of the embodiments of the disclosure, the step that the face image is enhanced to acquire an enhanced face image includes: brightness of the face image are acquired through a third preset algorithm; and contrast of a low gray level region is enhanced in the face image to acquire an enhanced face image. Therefore, details of the face image in dark light may be enhanced. Preferably, the face skin texture feature may be acquired from the enhanced face image to acquire a more accurate testing result. A low gray level region in the face image may be expanded through methods including but not limited to logarithmic transformation, histogram equalization, exponential transformation, etc.

Specifically, the step that brightness of the face image are acquired through a third preset algorithm includes: the face image is converted into an image in a YUV format through a color conversion algorithm, and a Y channel image in the image in the YUV format is extracted to acquire the brightness of the face image.

It is certain that those skilled in the art know that before or after the face image is enhanced to acquire the enhanced face image, the method may also include a face frame is tested and the image is scaled according to a tested size of the face frame, so as to acquire the face image with a required size.

Through the above steps, face skin texture testing may be realized, and the tested skin texture feature may include the freckle, the pore, the smoothness, the wrinkle, the under-eye dark circles, etc., and the testing precision may be improved without increasing the cost and the size of the hardware.

In at least one alternative embodiment, in one of the embodiments of the disclosure, after various skin texture features are tested, skin texture may also be evaluated by combining with the face complexion region. For example, in the case of the freckle, an area ratio of the freckle to the face complexion regions may be used as an index to evaluate severity of the freckle.

Figure 2:
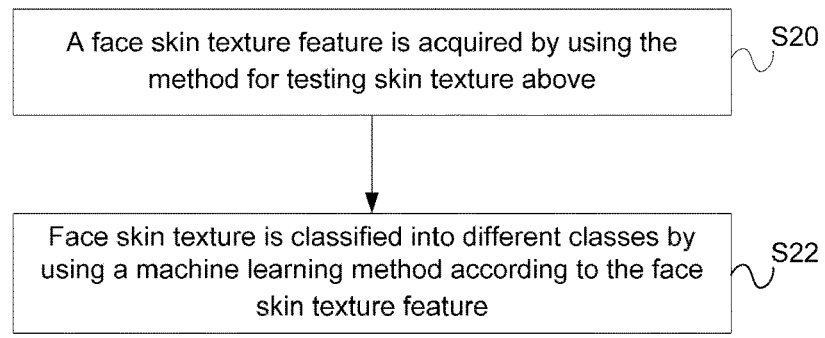
FIG. 2 is a flowchart of an optional method for classifying skin texture according to one of the embodiments of the disclosure.

According to another aspect of one of embodiments of the disclosure, a method for classifying skin texture is further provided. FIG. 2 is a flowchart of an optional method for classifying skin texture according to one of embodiments of the disclosure. As shown in FIG. 2, the method includes the following steps:

S20: a face skin texture feature is acquired by using the method for testing skin texture above; and S22: face skin texture is classified into different classes by using a machine learning method according to the face skin texture feature.

In at least one alternative embodiment, in one of the embodiments of the disclosure, the machine learning method may use a support vector machine or a perceptron. Specifically, the machine learning method may acquire an optimal classification function by training samples, wherein a face skin texture feature of each sample includes at least one of a complexion, a freckle, a pore, a wrinkle, under-eye dark circles and smoothness.

In one of the embodiments of the disclosure, the face skin texture feature is acquired through the above steps, that is, the above method for testing skin texture. According to the face skin texture feature, face skin texture is classified into different classes by using the machine learning method. In addition to testing of the face skin texture feature, the face skin texture may be classified into different classes, which facilitates supplying of nursing advice and recommending of suitable skin care products to different users or realizing of intelligent retouching.

With regard to intelligent retouching, in an application scene of one of the embodiments of the disclosure, corresponding retouching parameters may be set according to the different classes of the face skin texture, to realize intelligent retouching. For example, if a skin of somebody has many pores, wrinkles and freckles, and is relatively rough, face skin texture of the person is defined as bad, corresponding retouching parameters may be set accordingly, and for example, higher skin smoothing intensity in the retouching parameters may be set. On the contrary, if a skin of somebody has fewer pores, wrinkles and freckles, and is smooth, face skin texture of the person is defined as good, corresponding retouching parameters may be set accordingly, for example, lower skin smoothing intensity in the retouching parameters may be set, thereby guaranteeing that retouching parameters of each person are optimized, achieving a natural retouching effect and realizing intelligent retouching. The intelligent retouching technology realized by setting the corresponding retouching parameters according to the different classes of the face skin texture may be carried on an electronic device with a function such as video calling or photographing, such as an on-board electronic device (including but not limited to a touch screen, a navigator, etc.), a mobile phone, a digital camera, a tablet computer, a desktop computer, a skin texture testing instrument, etc. In an application environment, for example, in a car with an auxiliary driving function, especially in a car with an automatic driving function, because people don't need to operate a steering wheel when driving, people may have video chats, video conferences, photo taking, etc. in spare time, and by carrying the intelligent retouching technology on the above on-board electronic device with the video calling or the photo taking function, experience feeling of users may be improved.

Figure 3:
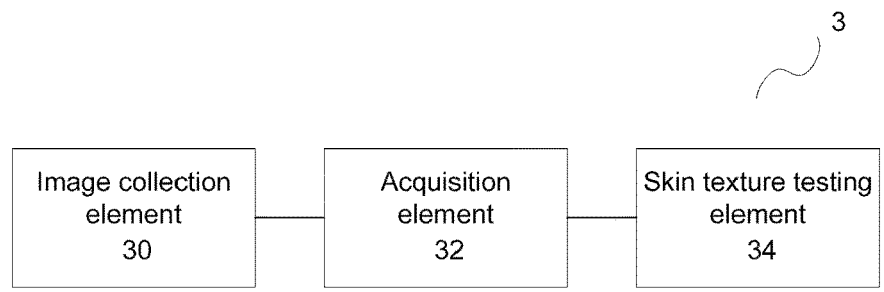
FIG. 3 is a structural block diagram of an optional device for testing skin texture according to one of the embodiments of the disclosure.
Figure 4:
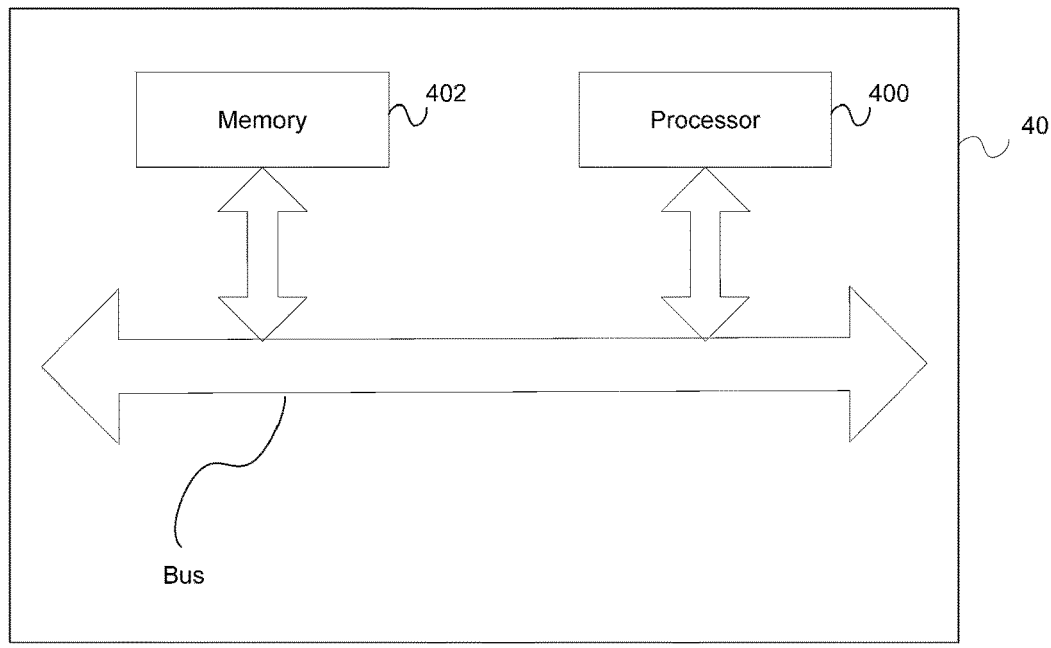
FIG. 4 is a structural block diagram of an optional electronic device according to one of the embodiments of the disclosure.

According to another aspect of one of the embodiments of the disclosure, a device for testing skin texture is further provided. FIG. 3 is a structural block diagram of an optional device for testing skin texture according to one of embodiments of the disclosure. As shown in FIG. 3, the device for testing skin texture includes:

an image collection element 30 is configured to acquire a face image.

In at least one alternative embodiment, in one of the embodiments of the disclosure, the image collection element may be an independent camera head or a camera head integrated on an electronic device, such as an independent RGB camera, or a built-in camera of an electronic device such as a mobile phone, a tablet computer, a desktop computer and a skin texture testing instrument.

An acquisition element 32 is configured to acquire a face complexion region and face feature points in the face image.

In at least one alternative embodiment, in one of the embodiments of the disclosure, the acquisition element 34 includes a complexion acquisition element and a feature points acquisition element. The complexion acquisition element is configured to acquire the face complexion region in the face image through a complexion testing algorithm. For example, the face image may be converted into a YCbCr color space through the complexion testing algorithm, then a CrCb value of each pixel point is put into an elliptic statistical model acquired according to skin pixels, if a coordinate of the CrCb is located in the elliptic statistical model, the pixel point is determined as a complexion, through which the face complexion region is acquired. The face feature points may be acquired by a supervised descent method (SDM) algorithm.

In at least one alternative embodiment, in one of the embodiments of the disclosure, in order to acquire a more accurate face complexion region, the complexion acquisition element is configured to remove five sense organ regions in the face image according to the face feature points, to acquire the face complexion region. In addition, the complexion acquisition element is configured to utilize a morphological algorithm (for example, a corrosion expansion algorithm) to process the face complexion region, so as to expand the removed five sense organ regions, thus avoiding the problem that the five sense organ regions are not completely removed and remain due to image offset.

A skin texture testing element 34 is configured to acquire a face skin texture feature from the face image according to the face complexion region and the face feature points.

In at least one alternative embodiment, in one of the embodiments of the disclosure, the face skin texture feature includes at least one of a complexion, a freckle, a pore, a wrinkle, under-eye dark circles and smoothness.

In at least one alternative embodiment, in one of the embodiments of the disclosure, the skin texture testing element 34 includes a freckle and pore testing element 340. The freckle and pore testing element 340 is configured to acquire a detailed diagram of the face complexion region by using a high pass algorithm, acquire a testing result of the freckle and/or the pore in the detailed diagram by using a first preset algorithm (for example, a local adaptive threshold algorithm), the testing result including at least one of a position, the number and an area; and distinguish the freckle and/or the pore according to shape features, wherein shape features of the pore are in a shape similar to a circle with a generally small area, and shape features of the freckle are in a shape with a relatively large area. Preferably, after the testing result of the freckle and/or pore in the detailed diagram is acquired by using the local adaptive threshold algorithm, isolated points of the freckle and/or pore may be removed by using the morphological algorithm (for example, the corrosion expansion algorithm) to eliminate influence of noise, and a connected domain algorithm is used to eliminate wrong points with an abnormal shape or an excessively large area in an initial testing result. Preferably, the above step may be implemented in the face complexion region with the five sense organ regions removed, so as to reduce a false testing rate of the freckle and/or the pore.

In at least one alternative embodiment, in one of the embodiments of the disclosure, the skin texture testing element 34 includes a smoothness testing element 342 which is configured to acquire, after the testing result of the freckle and/or the pore is acquired, the smoothness through a gray level co-occurrence matrix algorithm according to the testing result of the freckle and/or the pore. For example, parameters such as energy, entropy, contrast and inverse difference moment at 0 degree, 45 degrees, 90 degrees and 135 degrees are calculated through the gray level co-occurrence matrix algorithm, and then the smoothness feature is acquired with the 16 parameters.

In at least one alternative embodiment, in one of the embodiments of the disclosure, the skin texture testing element 34 includes a wrinkle testing element 344. The wrinkle testing element 344 is configured to acquire a detailed diagram of the face image by using a high pass algorithm, acquire face direction information according to the face feature points, acquire a testing result of the wrinkle in the detailed diagram by using a second preset algorithm, the testing result including at least one of a position, the number and an area, and determine a type of the wrinkle according to the face direction information and the face feature points. Preferably, after the second preset algorithm is used to acquire the testing result of the wrinkle in the detailed diagram, the morphological algorithm and the connected domain algorithm are used to eliminate some objects which obviously do not belong to the wrinkle.

In at least one alternative embodiment, in one of the embodiments of the disclosure, the steps that the testing result of the wrinkle in the detailed diagram of the wrinkle is acquired by using the second preset algorithm, and a type of the wrinkle is determined according to the face direction information and the face feature points may include: a position of a wrinkle is acquired by using the local adaptive threshold algorithm, mark a wrinkle which is generally in a horizontal direction is determined as a periocular wrinkle according to the face direction information and the face feature points, acquire a position of a wrinkle by using a Canny edge extraction algorithm, and according to the face direction information and the face feature points, a wrinkle which is generally in a horizontal direction is marked as a forehead wrinkle and a wrinkle which is generally in a diagonal direction is marked as a nasolabial wrinkle.

In at least one alternative embodiment, in one of the embodiments of the disclosure, the skin texture testing element 34 includes an under-eye dark circle testing element 346. The under-eye dark circle testing element 346 is configured to draw, according to eye feature points in the face feature points, an upper Bezier curve and a lower Bezier curve in the face image, locate testing regions of the under-eye dark circles, calculate a difference between a brightness mean of the testing regions of the under-eye dark circles and a surrounding region and determine severity of the under-eye dark circles.

In at least one alternative embodiment, in one of the embodiments of the disclosure, the device for testing skin texture 3 further includes an image enhancement element 31 configured to enhance the face image to acquire an enhanced face image.

In at least one alternative embodiment, in one of the embodiments of the disclosure, the image enhancement element 31 includes a brightness acquiring unit 310 and a contrast enhancement unit 312. The brightness acquiring unit 310 is configured to acquire brightness of the face image through a third preset algorithm. The contrast enhancement unit 312 is configured to enhance contrast of a low gray level region in the face image to acquire the enhanced face image. Therefore, details of the face image in dark light may be enhanced. Preferably, the face skin texture feature may be acquired from the enhanced face image to acquire a more accurate testing result. A low gray level region in the face image may be expanded through methods including but not limited to logarithmic transformation, histogram equalization, exponential transformation, etc.

Specifically, the step that brightness of the face image are acquired through a third preset algorithm includes: the face image is converted into an image in a YUV format through a color conversion algorithm, and a Y channel image in the image in the YUV format is extracted to acquire the brightness of the face image.

It is certain that those skilled in the art know that before or after the face image is enhanced to acquire the enhanced face image, the method may also include the image is scaled to acquire the face image with a required size.

In one of the embodiments of the disclosure, the above elements, that is, the image collection element 30 is configured to acquire the face image, the acquisition element 34 is configured to acquire the face complexion region and the face feature points in the face image; and the skin texture testing element 36 is configured to test the face skin texture feature of the face image according to the face complexion region and the face feature points. In this way, various face skin texture features may be tested on the basis of the face image, and more skin texture features may be tested as needed without increasing a cost and a size of hardware, thus improving testing precision.

According to another aspect of one of the embodiments of the disclosure, an electronic device is further provided. The electronic device 40 includes a processor 400 and a memory 402 configured to store an executable command of the processor 400, wherein the processor 400 is configured to execute the executable command to implement the method for testing skin texture according to any one described above.

According to another aspect of one of the embodiments of the disclosure, a storage medium is further provided. The storage medium includes a stored program, wherein when being run, the program controls a device where the storage medium is located to implement the method for testing skin texture according to any one described above.

In the above embodiments of the disclosure, descriptions of the embodiments have their own emphasis. For part not detailed in a certain embodiment, reference may be made to the relevant descriptions of other embodiments.

It should be understood that in several embodiments provided by the disclosure, technical contents disclosed may be implemented in other manners. The device embodiments described above are merely schematic. For example, unit division may be a logical function division and may have other division manners during actual implementation, for example, multiple units or components may be combined or integrated into another system, or some features may be ignored or not executed. On the other hand, the shown or discussed coupling or direct coupling or communication connection with each other may be indirect coupling or communication connection through some interfaces, units or elements, and may be in electrical or other forms.

The units described as separated parts may or may not be physically separated, and the parts displayed as units may or may not be physical units, that is, they may be located in one place or distributed to multiple units. Some or all of the units may be selected according to actual needs to achieve the purpose of a solution of this embodiment.

In addition, functional units in the embodiments of the disclosure may be integrated into one processing unit, or each unit may be physically present separately, or two or more units may be integrated into one unit. The above integrated units may be implemented in the form of hardware, or may be implemented in the form of software functional units.

If the integrated units are implemented in the form of the software functional units and sold or used as independent products, they may be stored in a computer readable storage medium. Based on such understanding, a technical solution of the disclosure may be embodied in the form of software products in essence or in part that contributes to the prior art or in part or whole, the computer software products are stored in the storage medium, and include several instructions to make one piece of computer equipment (which may be a personal computer, a server, a network device, etc.) execute whole or partial steps of the method of each embodiment of the disclosure. The foregoing storage medium includes a USB flash drive, a read-only memory (ROM), a random access memory (RAM), a mobile hard disk drive, a diskette or optical disk, etc., which may store program codes.

The described above is merely a preferred embodiment of the disclosure. It shall be noted that for those of ordinary skill in the art, they may make several improvements and polishing on the premise without deviating from a principle of the disclosure, and these improvements and polishing shall be integrated as falling within the protection scope of the disclosure.

INDUSTRIAL APPLICABILITY

The face image is acquired, the face complexion region and the face feature points in the face image are acquired; and the face skin texture feature of the face image is acquired according to the face complexion region and the face feature points. The face skin texture feature may be tested on the basis of the face image, and more skin texture features may be tested as needed without increasing the cost and the size of the hardware, thus improving the testing precision, and further solving the problems of a small number of skin texture features tested, poor testing precision, and a high cost and a large size of hardware in the prior art.

What is claimed is:

1. A method for testing skin texture, comprising:
acquiring a face image;
acquiring a face complexion region and face feature points in the face image; and
acquiring a face skin texture feature from the face image according to the face complexion region and the face feature points;
wherein the acquiring, when the face skin texture feature comprises the wrinkle, the face skin texture feature from the face image according to the face complexion region and the face feature points further comprises:
acquiring a detailed diagram of the face complexion region by using a high pass algorithm;
acquiring face direction information according to the face feature points;
acquiring a testing result of the wrinkle in the detailed diagram by using a preset algorithm; and
determining a type of the wrinkle according to the testing result of the wrinkle, face direction information and the face feature points.

2. The method as claimed in claim 1, wherein acquiring the face complexion region and the face feature points in the face image comprises:
acquiring the face complexion region by using a complexion testing algorithm.

3. The method as claimed in claim 1, further comprising:
removing five sense organ regions of the face image according to the face feature points, to acquire the face complexion region.

4. The method as claimed in claim 3, further comprising:
processing the face complexion region by using a morphological algorithm, to expand a coverage of the five sense organ regions removed.

5. The method as claimed in claim 1, wherein the acquiring, when the face skin texture feature comprises the freckle, the face skin texture feature from the face image according to the face complexion region and the face feature points further comprises:
acquiring a detailed diagram of the face complexion region by using a high pass algorithm;
acquiring a testing result of the freckle and/or the pore in the detailed diagram by using another preset algorithm, wherein the testing result including at least one of a position, the number and an area; and
distinguishing the freckle and/or the pore according to shape features of the freckle.

6. The method as claimed in claim 5, wherein when the face skin texture feature comprises smoothness, the method comprises:
acquiring the smoothness through a gray level co-occurrence matrix algorithm according to the testing result of the freckle.

7. The method as claimed in claim 1, wherein the acquiring, when the face skin texture feature comprises under-eye dark circles, the face skin texture feature from the face image according to the face complexion region and the face feature point comprises:
drawing, according to eye feature points in the face feature points, an upper Bezier curve and a lower Bezier curve in the face image, locating the under-eye dark circles, and acquiring a testing result of the under-eye dark circles in the face image by determining a difference between a brightness mean of positions of the under-eye dark circles and a surrounding region.

8. The method as claimed claim 1, further comprising:
enhancing the face image to acquire an enhanced face image.

9. The method as claimed in claim 8, wherein the enhancing the face image to acquire the enhanced face image comprises:
acquiring brightness of the face image; and
enhancing contrast of a low gray level region in the face image according to the brightness to acquire the enhanced face image.

10. The method as claimed in claim 9, wherein the acquiring brightness of the face image comprises:
converting the face image into an image in a YCbCr format through a color conversion algorithm, and extracting a Y channel image in the image in the YCbCr format to acquire the brightness of the face image.

11. A method for classifying skin texture, comprising:
acquiring a face skin texture feature by using the method for testing skin texture of claim 1; and
classifying face skin texture into different classes by using a machine learning method according to the face skin texture feature.

12. The method as claimed in claim 11, further comprising:
setting corresponding retouching parameters according to different classes of the face skin texture.

13. The method as claimed in claim 12, wherein the method is applied to an electronic device with a video calling or photographing function.

14. A device for testing skin texture, comprising:
an image collection element configured to acquire a face image;
an acquisition element configured to acquire a face complexion region and a face feature points in the face image; and
a skin texture testing element configured to test a face skin texture feature from the face image according to the face complexion region and the face feature points;
wherein the skin texture testing element further configured to when the face skin texture feature comprises the wrinkle, acquire a detailed diagram of the face complexion region by using a high pass algorithm; acquire face direction information according to the face feature points;
acquire a testing result of the wrinkle in the detailed diagram by using a preset algorithm; and
determine a type of the wrinkle according to the testing result of the wrinkle, face direction information and the face feature points.

15. The device as claimed in claim 14, wherein the acquisition element comprises a complexion acquisition element configured to acquire the face complexion region in the face image through a complexion testing algorithm.

16. The method as claimed in claim 1, wherein the acquiring, when the face skin texture feature comprises the pore, the face skin texture feature from the face image according to the face complexion region and the face feature points further comprises:
acquiring a detailed diagram of the face complexion region by using a high pass algorithm;

acquiring a testing result of the pore in the detailed diagram by using another preset algorithm, wherein the testing result including at least one of a position, the number and an area; and distinguishing the pore according to shape features of the pore.

17. The method as claimed in claim 16, wherein when the face skin texture feature comprises smoothness, the method comprises:

acquiring the smoothness through a gray level co-occurrence matrix algorithm according to the testing result of the pore.

18. The method as claimed in claim 1, wherein the acquiring, when the face skin texture feature comprises the freckle and the pore, the face skin texture feature from the face image according to the face complexion region and the face feature points further comprises:

acquiring a detailed diagram of the face complexion region by using a high pass algorithm;

acquiring a testing result of the freckle and the pore in the detailed diagram by using another preset algorithm, wherein the testing result including at least one of a position, the number and an area; and distinguishing the freckle and the pore according to shape features of the freckle and the pore.

19. The method as claimed in claim 18, wherein when the face skin texture feature comprises smoothness, the method comprises:

acquiring the smoothness through a gray level co-occurrence matrix algorithm according to the testing result of the freckle and the pore.

* * * * *